United States Patent
Wang

(10) Patent No.: US 7,944,826 B2
(45) Date of Patent: May 17, 2011

(54) METHOD AND SYSTEM FOR SERVICE APPLICATION AND SERVICE APPLICATION CONTROL AGENT

(75) Inventor: Chuntao Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 74 days.

(21) Appl. No.: 12/357,774

(22) Filed: Jan. 22, 2009

(65) Prior Publication Data

US 2009/0154494 A1 Jun. 18, 2009

Related U.S. Application Data

(63) Continuation of application No. PCT/CN2007/001609, filed on May 17, 2007.

(30) Foreign Application Priority Data

Aug. 21, 2006 (CN) .......................... 2006 1 0111290

(51) Int. Cl.
*H04J 1/16* (2006.01)
*H04J 3/14* (2006.01)
*H04L 12/28* (2006.01)
*H04N 7/173* (2006.01)

(52) U.S. Cl. .......... 370/230; 370/235; 370/252; 725/95; 725/100; 725/120

(58) Field of Classification Search .................. None
See application file for complete search history.

(56) References Cited

U.S. PATENT DOCUMENTS

| | | | | |
|---|---|---|---|---|
| 6,745,392 | B1 * | 6/2004 | Basawapatna et al. | 725/120 |
| 2003/0061619 | A1 * | 3/2003 | Giammaressi | 725/95 |
| 2003/0187978 | A1 | 10/2003 | Nakamura et al. | |
| 2005/0220132 | A1 * | 10/2005 | Oman et al. | 370/432 |
| 2007/0201366 | A1 | 8/2007 | Liu | |

FOREIGN PATENT DOCUMENTS

| | | |
|---|---|---|
| CN | 1747400 | 3/2006 |
| CN | 1764151 | 4/2006 |

OTHER PUBLICATIONS

International Telecommunicaitons Union (ITU-T), "Terms of Reference of NGN-GSI", Jul. 2009.*

(Continued)

*Primary Examiner* — Daniel J Ryman
*Assistant Examiner* — Cassandra Decker
(74) *Attorney, Agent, or Firm* — Finnegan, Henderson, Farabow, Garrett & Dunner LLP

(57) ABSTRACT

A service application method and system, and a service application control agent (SACA) for reducing the delay of service application are provided. The method includes the following steps. An SACA receives service application information sent from a customer premises equipment (CPE). The SACA queries for Quality of Service (QoS) parameters corresponding to the service according to the service application information. Resource authorization and reservation request information containing the QoS parameters is sent to a resource and admission control unit. The resource and admission control unit verifies the request information to be authorized and admitted, and delivers a control strategy to a transport unit after the verification is passed. A service application system and an SACA are also provided correspondingly.

1 Claim, 8 Drawing Sheets

OTHER PUBLICATIONS

Dong Sun Lucent Technology USA "Draft Recommendation Y.RACF Version 90.4" TD 109 Rev. 1; ITU-T draft study period 2005-2008, International Telecommunication Union, Geneva; Study Group 13, 2006:pp. 1-72. XP 017410386.

FGNGN Chairman : "Guidelines for NGN Security Release 1 (FGNGN-0D-00254) ; TD 2227" ITU-T draft study period 2005-2008, International Telecommuncation Union, Geneva; Study Group 17, 2006: pp. 1-18. XP017412410.

International Telecommunication Union, Telecommunication Standarization Sector Study Period 2005-2008, Focus Group on Next Generation Networks FGNGN-OD-00074 (Original: English) memo, WG3, Geneva, Nov. 30 Dec. 3, 2004, Output Document, Source: Editors, Title: Revision 1 of TR-RACS.

* cited by examiner

METHOD AND SYSTEM FOR SERVICE APPLICATION AND SERVICE APPLICATION CONTROL AGENT

CROSS-REFERENCE TO RELATED APPLICATIONS

This application is a continuation of International Application No. PCT/CN2007/001609 filed on May 17, 2007, which claims priority to Chinese Patent Application No. 200610111290.2, filed on Aug. 21, 2006, both of which are hereby incorporated by reference in their entireties.

FIELD OF THE TECHNOLOGY

The disclosure relates to the communication field, and more particularly to a service application method, a service application system, and a service application control agent (SACA).

BACKGROUND OF THE INVENTION

In order to ensure the end-to-end Quality of Service (QOS) of service transportation, the International Telecommunication Union (ITU-T) defines the network architecture of resource and admission control functions (RACFs) of Next Generation Networks (NGN). Referring to FIG. 1, in this network architecture, an RACF 120 is introduced between a service control function (SCF) 110 and a transport function (TF) 130 for implementing negotiation and reservation of end-to-end transport resources for a service at an access network and a backbone network bearing the service.

In some application scenarios, the user experience of a service is closely correlated to the delay of service application. For example, a user is sensitive to the delay in channel switching when using a broadcast television (BTV) service. In order to solve this problem, a service application method is provided in the prior art.

In the RACF architecture, according to different application scenarios, two bearer resource reservation modes are defined, namely, a push mode and a pull mode.

FIG. 2 is a flow chart of service application in the push mode.

201, a customer premises equipment (CPE) 150 sends a "service request" message (for example, SIP Invite and HTTP Get) to the SCF 110 to apply for a service.

202, the SCF 110 extracts/generates QoS parameters (for example, bandwidth) required by the service, and then sends a "resource reservation request" message containing the QoS parameters to the RACF 120, so as to request authorization and reservation of bearer resources.

203, the RACF 120 performs authorization and admission control according to operator policy rules, use conditions of the bearer resources, and a user profile in a network attachment control function (NACF) 140. If the admission is granted, the RACF delivers control strategies such as gate control, packet marking, and bandwidth allocation to the TF 130.

FIG. 3 is a flow chart of service application in the pull mode.

301, the CPE 150 sends a "service request" message (for example, SIP Invite) to the SCF 110 to apply for a service.

302, the SCF 110 extracts/generates QoS parameters (for example, bandwidth) required by the service, and then sends a "resource reservation request" message containing the QoS parameters to the RACF 120, so as to request authorization of bearer resources.

303, the RACF 120 performs authorization verification according to operator policy rules. If the service is authorized, an authorization token is assigned to the service.

304, the SCF 110 sends information such as the token to the CPE 150.

305, the CPE 150 initiates a bearer resource reservation request the service to be applied through a QoS signaling at the bearer layer. The request contains the token assigned by the RACF 120.

306, upon receiving the bearer resource reservation request, the TF 130 at the edge of the network sends a "resource reservation request" message containing the token to the RACF 120, so as to request reservation of the bearer resources.

307, the RACF 120 performs admission control according to operator policy rules, use conditions of the bearer resources, and a user profile in the NACF 140. If the admission is granted, the RACF delivers control strategies such as gate control, packet marking, and bandwidth allocation to the TF 130.

The inventor of the disclosure has found through studies that interactive processing of multiple network elements such as SCF, RACF, NACF and TF is required for each service application. Moreover, since the SCF is generally located at the network core domain when networking is actually performed, a message needs to be transferred from the CPE to the SCF through multiple network equipments, resulting in a long delay in processing the service application and rendering the service that is sensitive to the delay of service application hard to be deployed.

SUMMARY OF THE INVENTION

Accordingly, the disclosure is directed to a service application method, a service application system, and a service application control agent (SACA), for reducing the delay of service application.

A service application method is provided in an embodiment of the disclosure, which includes the following steps. An SACA receives service application information sent from a customer premises equipment (CPE). The SACA queries for Quality of Service (QoS) parameters corresponding to the service according to the service application information. Resource authorization and reservation request information containing the QoS parameters is sent to a resource and admission control unit. The resource and admission control unit verifies the request information to be authorized and admitted, and delivers a control strategy to a transport unit after the verification is passed. A service application system is provided, which includes a CPE, an SACA, a resource and admission control unit, and a transport unit.

The CPE is adapted to send service application information to the SACA.

The SACA is adapted to query for QoS parameters corresponding to the service according to the service application information.

The resource and admission control unit is adapted to verify request information to be authorized and admitted.

The transport unit is adapted to perform a control strategy delivered by the resource and admission control unit after the verification is passed.

An SACA is provided in an embodiment of the disclosure, which includes a service control agent unit and a sending unit.

The service control agent unit is adapted to query for QoS parameters corresponding to a service according to received service application information.

The sending unit is adapted to send resource authorization and reservation request information containing the QoS parameters.

In the disclosure, the service application information of the CPE is directly received by the SACA without being sent to a service control unit at a network core domain, thus reducing the delay of the service application information of the CPE from being sent to being received.

BRIEF DESCRIPTION OF THE DRAWINGS

The disclosure will become more fully understood from the detailed description given herein below for illustration only, and thus are not limitative of the disclosure.

DETAILED DESCRIPTION OF THE EMBODIMENTS

The embodiments of the disclosure provides a method for service application, a system for service application, and a service application control agent (SACA) for reducing the delay of service application.

Figure 1:
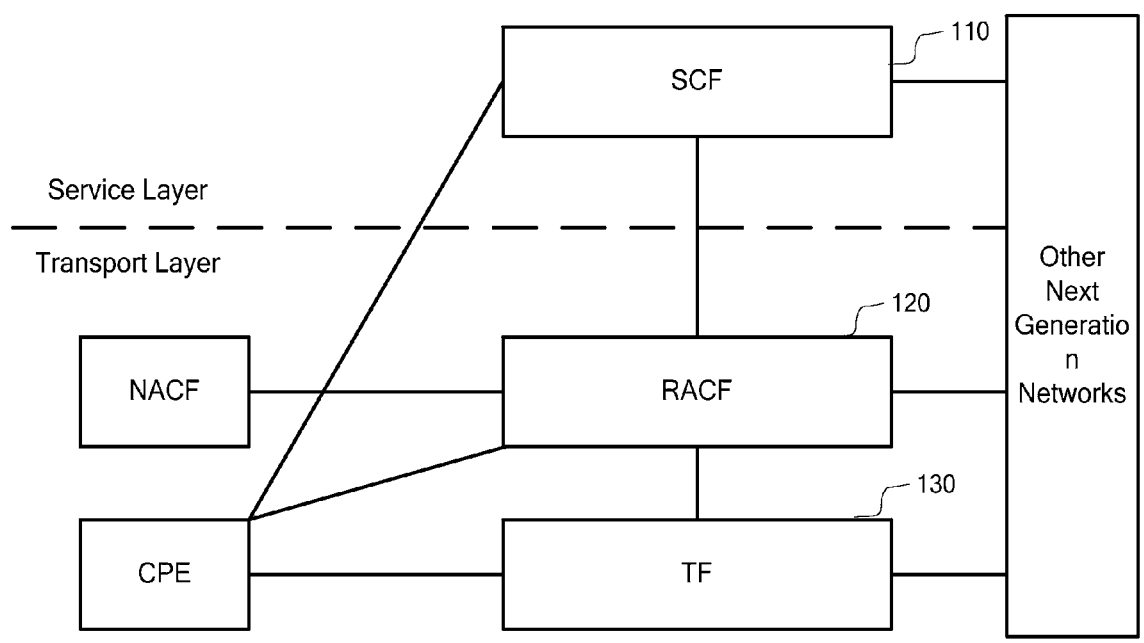
FIG. 1 shows an RACF architecture in the prior art.
Figure 2:
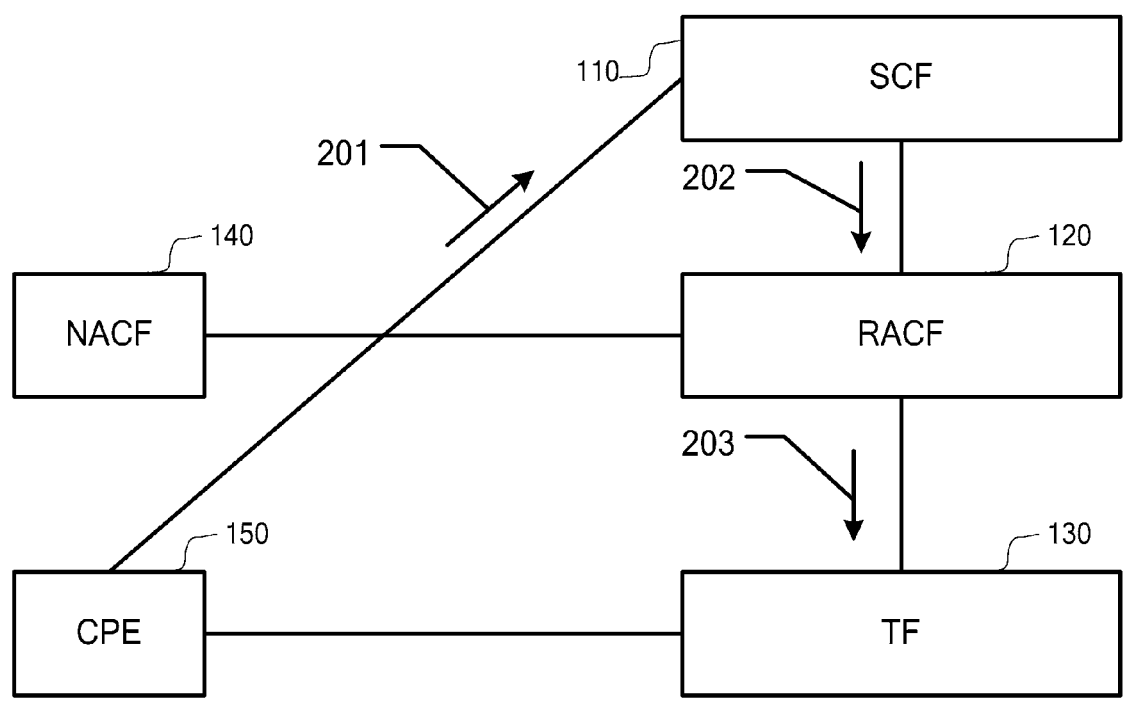
FIG. 2 is a flow chart of service application in the push mode in the prior art.
Figure 3:
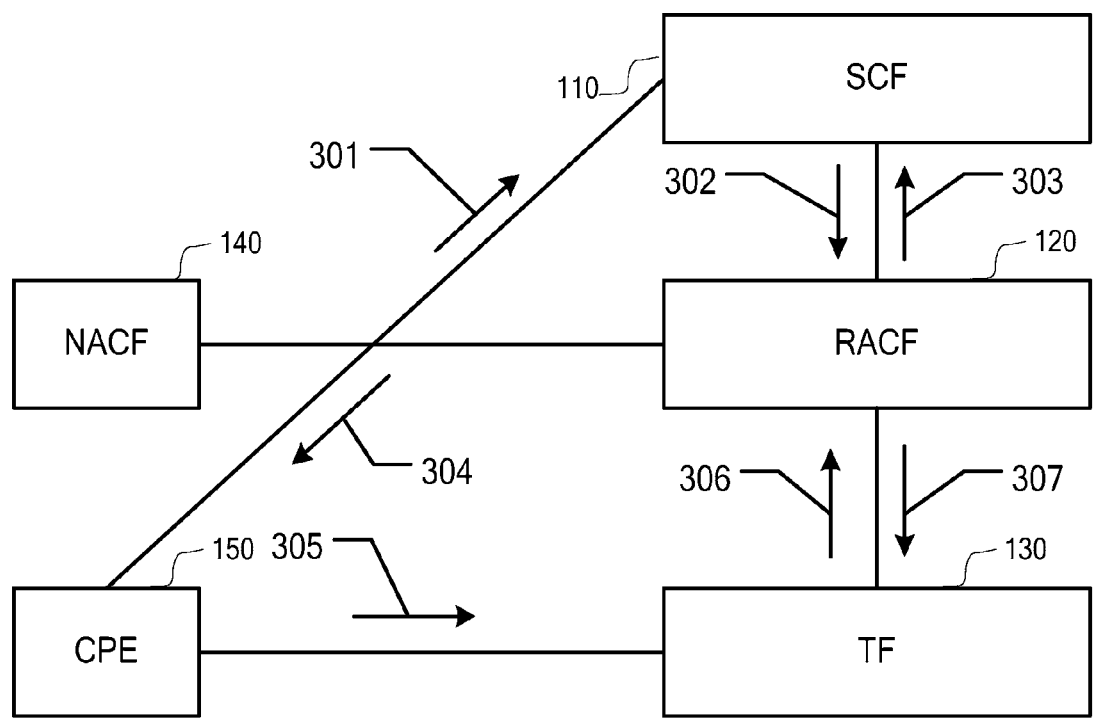
FIG. 3 is a flow chart of service application in the pull mode in the prior art.
Figure 4:
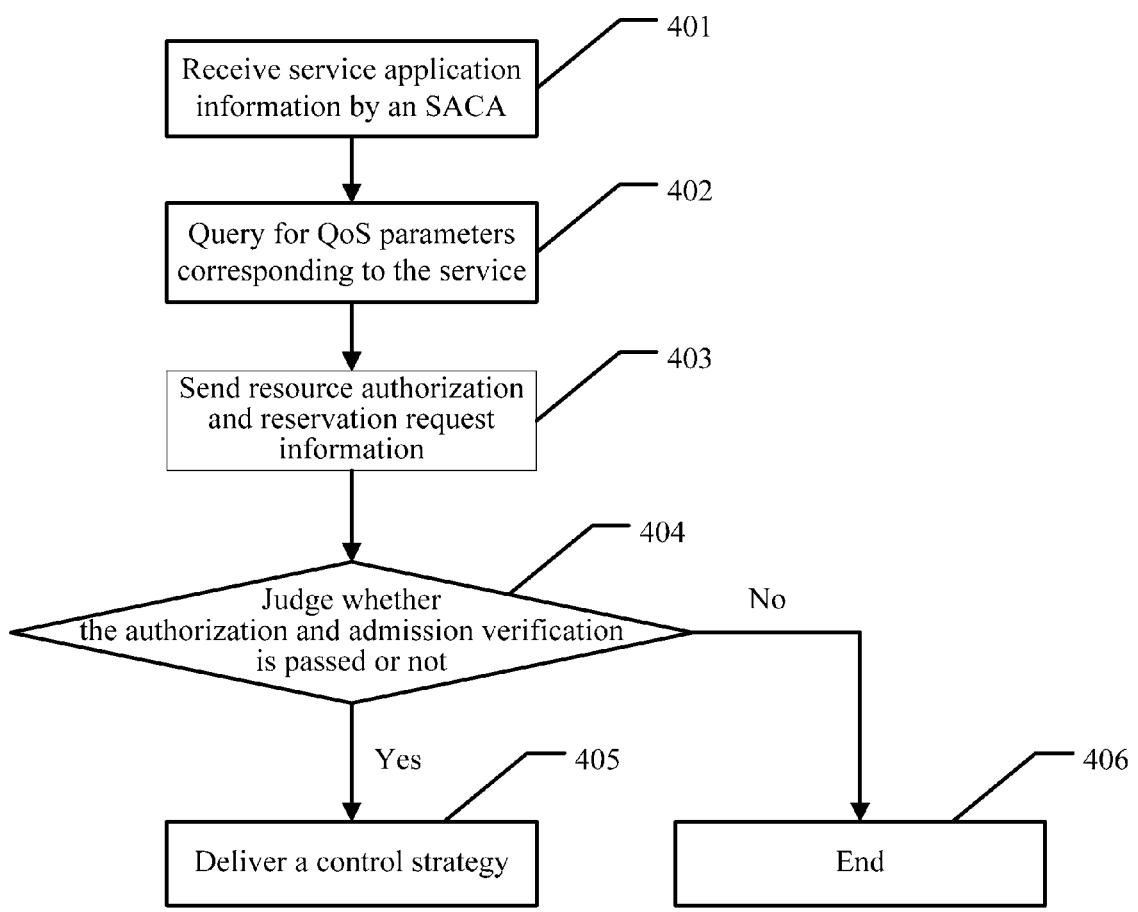
FIG. 4 is a flow chart of a method according to an embodiment of the disclosure.

Referring to FIG. 4, the method according to an embodiment of the disclosure, includes:

401, an SACA receives service application information from a customer premises equipment (CPE).

402, the SACA queries for QoS parameters corresponding to the service according to the received service application information.

403, the SACA sends resource authorization and reservation request information containing the QoS parameters to a resource and admission control function (RACF).

404, the RACF verifies the request to be authorized and admitted according to current network conditions. If the verification is passed, Step 405 is performed; otherwise, Step 406 is performed.

405, the RACF delivers a control strategy to a transport function (TF), the TF starts to replicate information for serving the CPE, and the service application of the CPE is ended.

406, the flow is ended, and request failure information is returned to the CPE.

Figure 5:
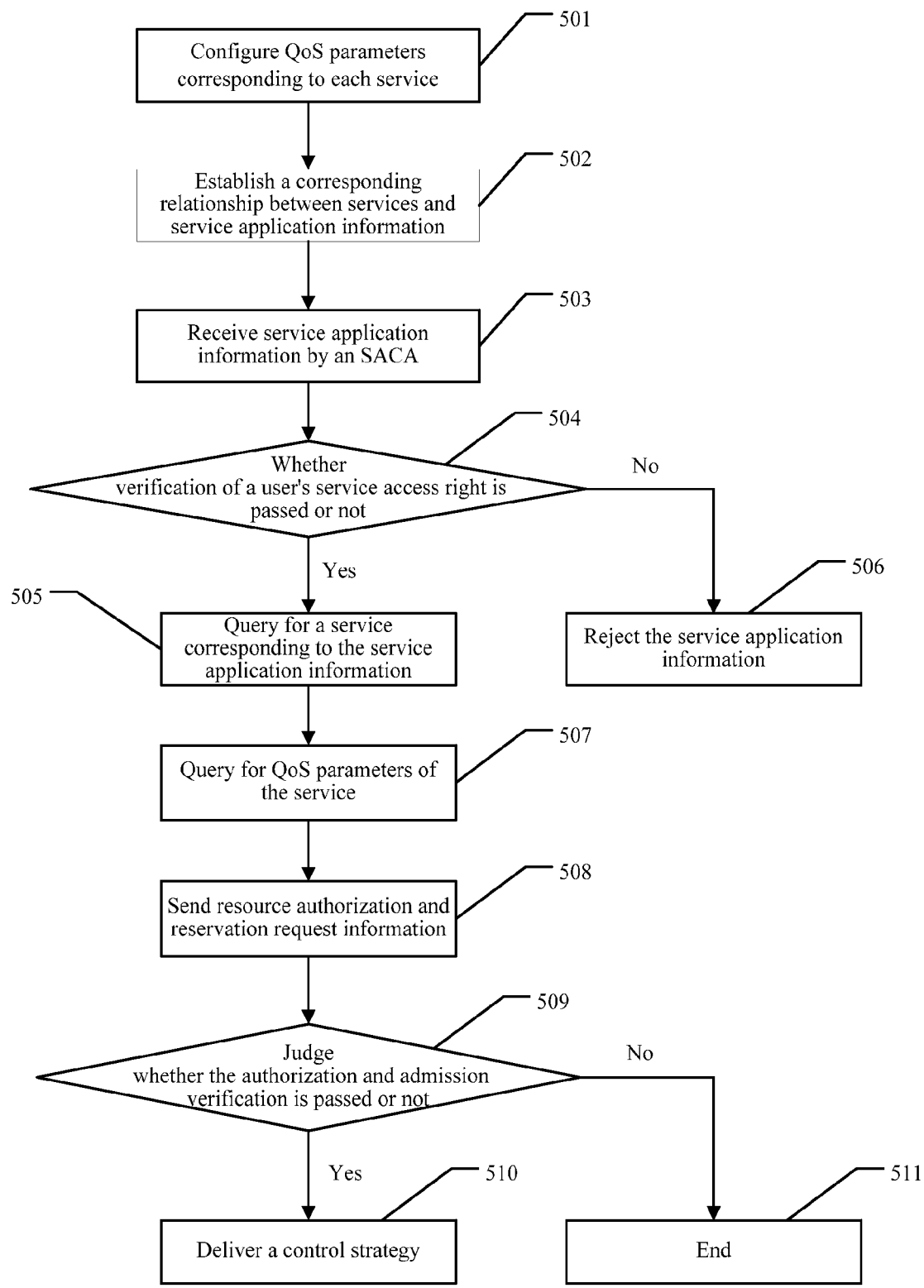
FIG. 5 is a flow chart of a method according to another embodiment of the disclosure.

Referring to FIG. 5, the method according to a second embodiment of disclosure, includes:

501, QoS parameters corresponding to each service are configured.

The QoS parameters corresponding to each service are configured by an SACA.

502, a corresponding relationship is established between services and service application information.

The corresponding relationship is established so that different service application information is corresponding to different services.

503, the SACA receives service application information from a CPE.

The service application information may require either to start to use a certain service or exiting the current service, so that other services may be added at the same time.

504, the SACA verifies the service application information and judges whether a user/CPE has a service access right or not. If the user/CPE has the service access right, Step 505 is performed; otherwise, Step 506 is performed.

505, a service corresponding to the service application information is queried, and Step 507 is performed.

The SACA queries for the service corresponding to the received service application information according to the corresponding relationship established between the services and the service application information.

506, the application is rejected, information is returned, and the flow is ended.

507, QOS parameters of the service are queried.

The QOS parameters of the service are queried by the SACA.

508, the SACA sends resource authorization and reservation request information containing the QoS parameters to an RACF.

The SACA sends a "resource reservation request" message containing the QoS parameters to the RACF, so as to request authorization of bearer resources.

509, the RACF verifies the request to be authorized and admitted according to current network conditions. If the verification is passed, Step 510 is performed; otherwise, Step 511 is performed.

The RACF makes the judgment according to the network status. The network status specifically includes use conditions of transport network resources and the multicast replication capability of TF. It should be understood that the RACF can also make the judgment through some other parameters related to the current network conditions.

The RACF judges whether the current network conditions are suitable for admission of an application for a new multicast service. If network resources are sufficient, the admission is granted. If the network resources are insufficient, for example, the bandwidth occupancy of the multicast service exceeds a threshold value, or the transport network resource occupancy exceeds a threshold value, or the multicast replication power of TF reaches a threshold value, the application for the new multicast service is not allowed to be admitted.

510, a control strategy is delivered.

The RACF delivers the control strategy to a TF, the TF starts to replicate information for serving the CPE, and the service application of the CPE is ended.

511, the flow is ended, and request failure information is returned to the CPE.

In this embodiment, the order of Step 501 of configuring QoS parameters corresponding to each service and Step 502 of establishing a corresponding relationship between services and service application information is not particularly limited, and Step 502 may also be performed first.

Moreover, Step 501 and Step 502 may be selectively performed as required. For example, Step 501 and/or Step 502 may only be performed for the first time of operation, and Step 501 and/or Step 502 may not be performed again for subsequent operations after the setting is completed.

In addition, after Step 510, the method further includes associating services that have the same forward path, use the same type of bearer resources, will not be accessed at the same time, and may need bearer resources of different bandwidths.

When a user switches among the associated services, if a bandwidth of bearer resources that have been applied is equal to that required by the service, the SACA directly admits the service application without applying to the resource and admission control unit for authorization of bearer resources again. If the bandwidth of the bearer resources that have been applied is narrower than that required by the service, the service application is admitted only if authorization of the insufficient portion is applied to the resource and admission control unit. If the bandwidth of the bearer resources that have been applied is wider than that required by the service, idle bearer resources are released to the resource and admission control unit after the service application is admitted.

Figure 6:
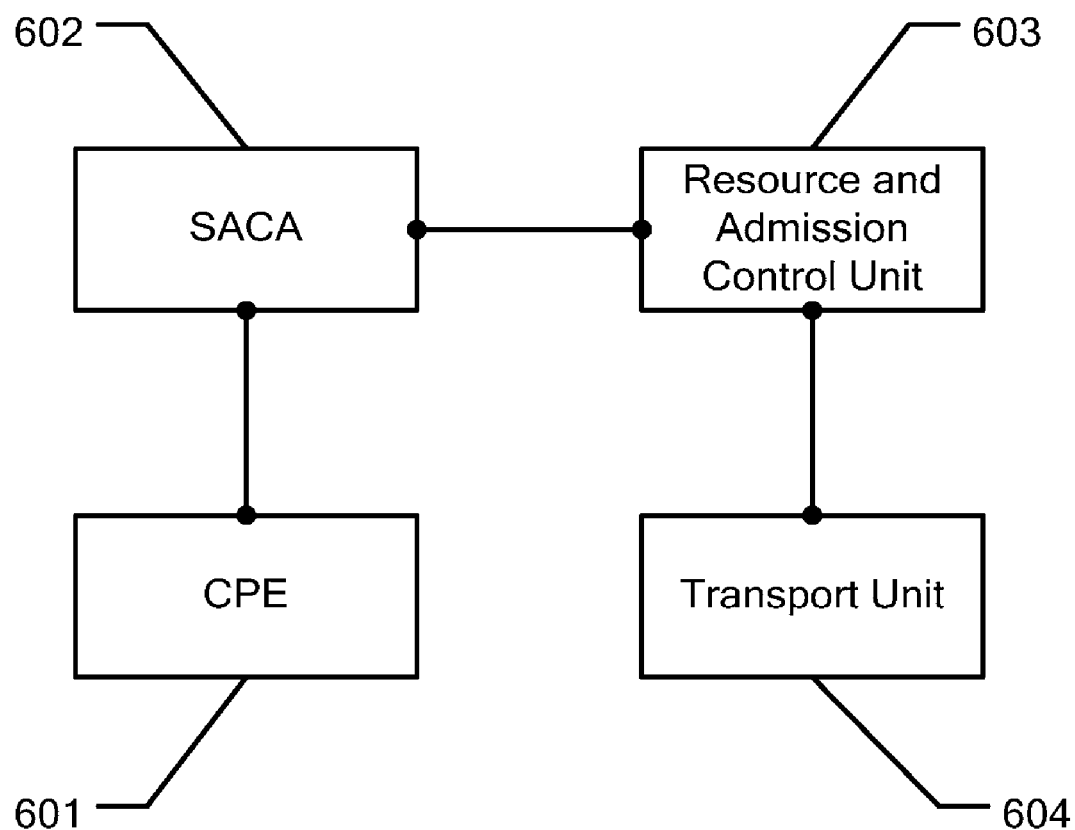
FIG. 6 is a schematic view of a system according to an embodiment of the disclosure.

FIG. 6 is a block diagram of a system according to an embodiment of the disclosure. The system includes a CPE 601, a transport unit 604, a resource and admission control unit 603, and an SACA 602.

The CPE 601 sends service application information to the SACA 602. The SACA 602 queries for QoS parameters required by the corresponding service after receiving the information, and send resource authorization and reservation request information containing the QoS parameters to the resource and admission control unit 603. The resource and admission control unit 603 verifies the request information to be authorized and admitted and delivers a control strategy to the transport unit 604 after the verification is passed.

The SACA 602 is integrated in the transport unit 604 or is independently disposed at a network position adjacent to the CPE.

Figure 7:
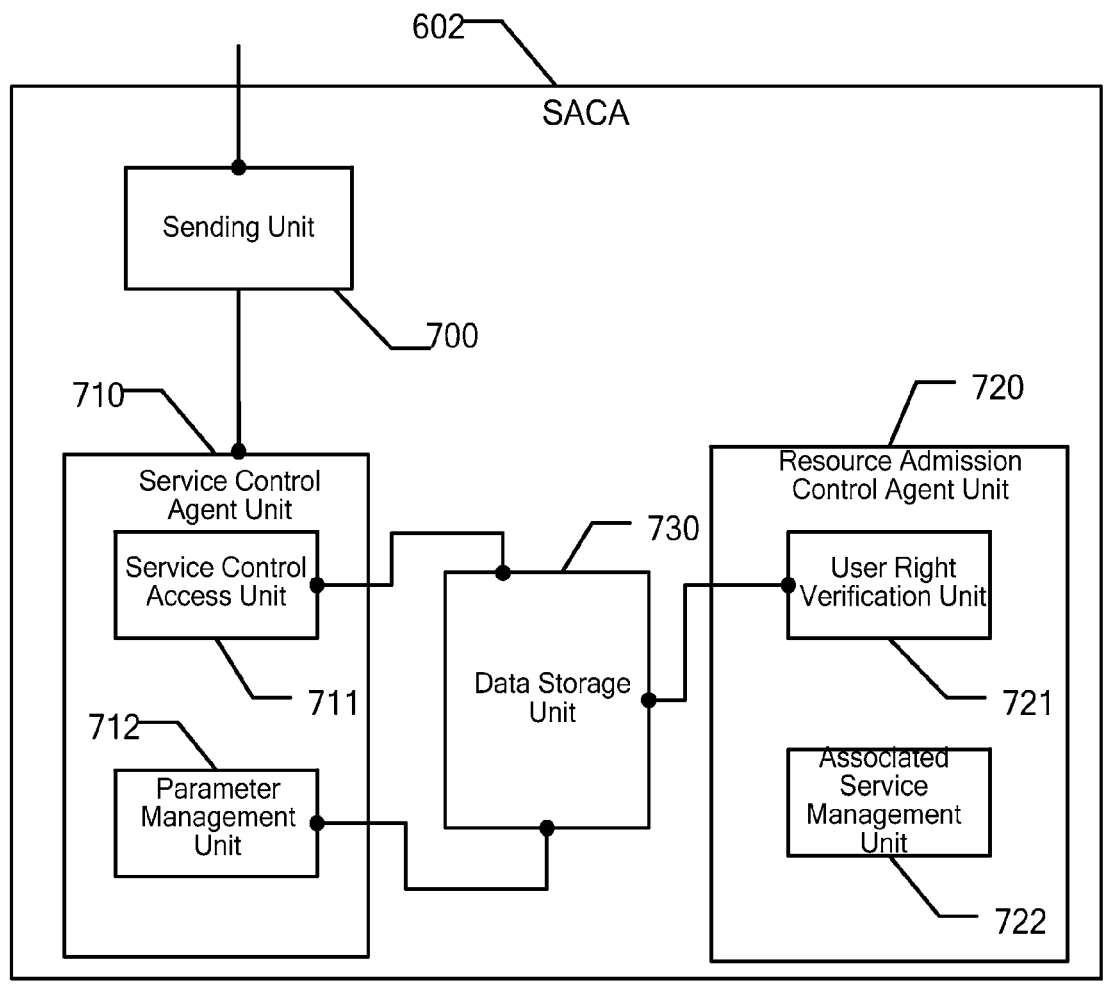
FIG. 7 is a schematic view of an SACA according to an embodiment of the disclosure.

Referring to FIGS. 7 and 6 together, an SACA 602 provided in an embodiment of the disclosure includes a service control agent unit 710, a sending unit 700, a resource admission control agent unit 720, and a data storage unit 730.

The service control agent unit 710 is adapted to query for the QoS parameters corresponding to the service according to the received service application information.

The sending unit 700 is adapted to send the resource authorization and reservation request information containing the QoS parameters.

The data storage unit 730 is adapted to store a corresponding relationship set between services and service application information, and QoS parameters configured correspondingly for each service.

The resource admission control agent unit 720 is adapted to judge a service access right of a user, associate user services, and manage bearer resources applied by the associated services.

The service control agent unit 710 includes a service control access unit 711 and a parameter management unit 712.

The resource admission control agent unit 720 includes a user right verification unit 721 and an associated service management unit 722. The service control access unit 711 is adapted to preset a service access method in the SACA 602, that is, to preset a corresponding relationship between services and service application information. When the CPE 601 needs to apply for /switch a service, the CPE 601 sends application/switching messages. The SACA 602 detects the messages and completes the service access control according to the service application/switching messages, that is, finds the corresponding service according to the service application information.

The parameter management unit 712 is adapted to preset QoS parameters of services in the SACA 602. When the CPE 601 applies for a service, the SACA 602 can directly obtain QoS parameters required by the service.

The user right verification unit 721 is adapted to preset the service access right of the user in the SACA 602. When the CPE 601 applies for a service, the SACA 602 can directly judge whether the user has the access right or not.

The associated service management unit 722 is adapted to associate user services in accordance with conditions and to manage the associated services.

The sending unit 700 may be disposed in the service control agent unit 710.

Managing the services specifically refers to associating services that have the same forward path, may use the same type of bearer resources, will not be accessed at the same time, and may need bearer resources of different bandwidths.

Managing the associated services refers to that, if a bandwidth of bearer resources that have been applied is equal to that required by the service, the service application is directly admitted without applying to the resource and admission control unit 603 for authorization of bearer resources again; if the bandwidth of the bearer resources that have been applied is narrower than that required by the service, the service application is admitted only if authorization of the insufficient portion is applied to the resource and admission control unit 603; and if the bandwidth of the bearer resources that have been applied is wider than that required by the service, idle bearer resources are released to the resource and admission control unit 603 after the service application is admitted.

The method and system of the disclosure have a good effect on some services that are sensitive to the delay. For example, a user is sensitive to the delay in channel switching when using the BTV service. In practice, all program sources are launched to an access node (AN) such as a digital subscriber line access multiplexer (DSLAM) and an exchanger in advance. When a user switches to a channel, a user set top box (STB) sends an Internet group management protocol (IGMP) joining/leaving packet, and the AN searches the IGMP packet and completes user-oriented traffic replication, thereby achieving a fast channel switching.

Figure 8:
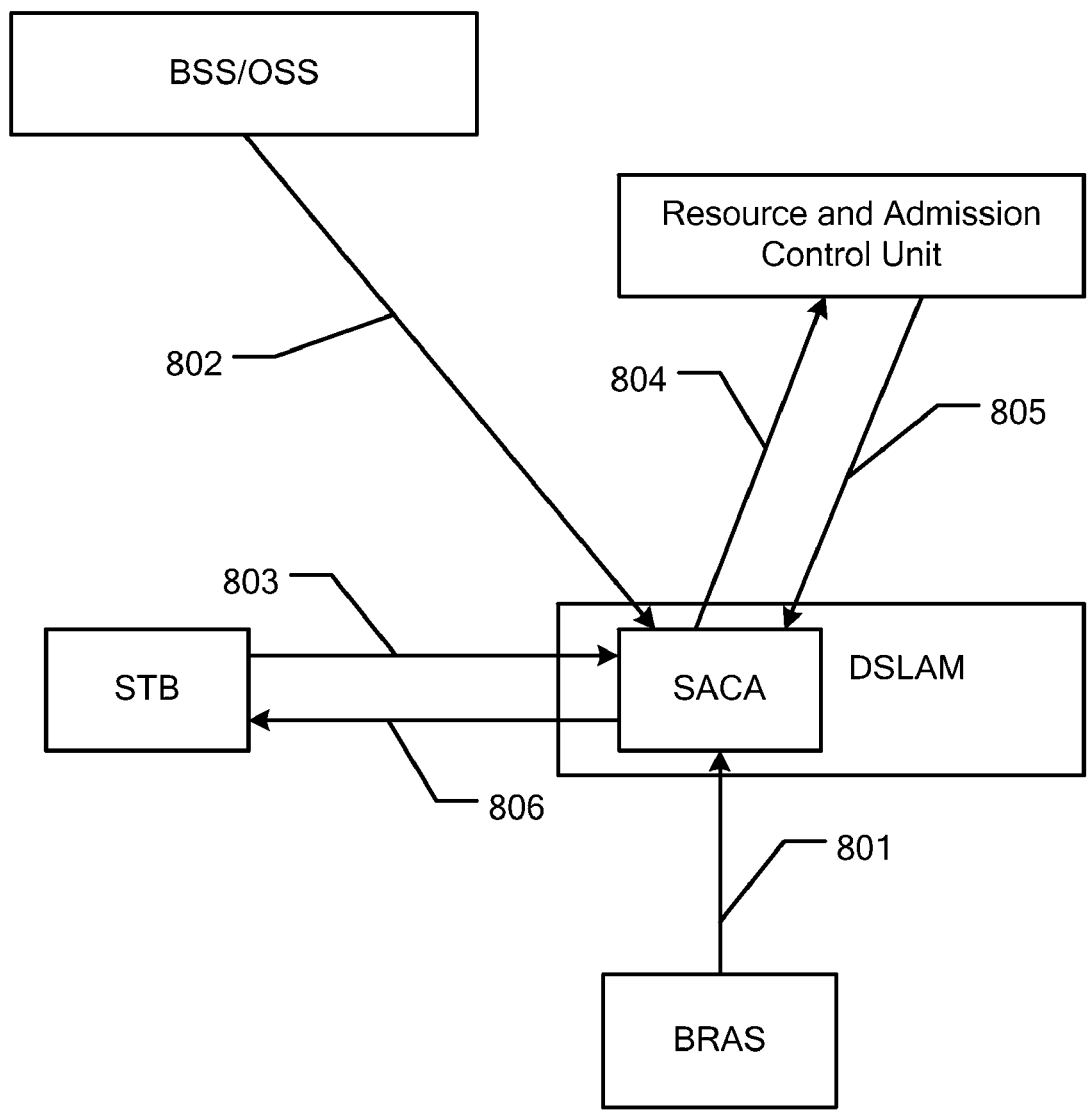
FIG. 8 is a schematic view of an application according to an embodiment of the disclosure.

FIG. 8 shows an application of the method and system according to an embodiment of the disclosure. In this scenario, an SACA is located on a DSLAM. Specific steps are given below.

801, all channel program streams from a broadband remote access server (BRAS) are launched in advance to the DSLAM that can be controlled by the SACA.

802, a business and operation support system (BSS/OSS) configures a corresponding relationship between channels and IP multicast addresses, bearer bandwidth required by each channel, and rights of a user to watch the channels to the SACA in advance. Since all BTV channels use the same transport path (from DLSAM to STB) and cannot be watched at the same time, the SACA can associate all BTV channels that can be watched by the user.

803, when the user switches to a channel, an STB sends an IGMP packet, and the SACA detects the IGMP packet and determines whether the user can watch the channel according to multicast addresses, corresponding relationship between channels and multicast addresses, and rights of the user to watch the channels in the IGMP packet. If the user can watch, a transport bandwidth required by the channel is extracted and compared with the transport bandwidth required by the current channel (associated service).

If the bandwidth of the new channel is equal to that of the current channel, Step 806 is performed directly.

If the bandwidth of the new channel is wider than that of the current channel, Step 804 and Step 805 are performed first.

If the bandwidth of the new channel is narrower than that of the current channel, Step 806 is performed first, and then Step 804 is performed.

804, if resources are insufficient, the SACA sends a bearer resource reservation request to an RACF, but only applying for the insufficient bearer resources. If the resources are sufficient, the SACA sends a bearer resource release indication to the RACF, but only releasing idle bearer resources.

805, the RACF performs resource admission control processing according to use conditions of the bearer resources and notifies the processing result of resource admission control to the SACA.

If the RACF admits the resource request, the SACA performs Step 806.

If the RACF does not admit the resource request, the channel switching of the user fails.

806, the SACA controls the DSLAM to complete user-oriented BTV channel replication, so as to allow the user to watch the new channel.

In most application scenarios, different BTV channels use the same transport bandwidth or merely require two grades of transport bandwidth (ordinary program/high definition program). Channel switching can be achieved simply through interaction of one or three control messages, which significantly reduces the processing delay of service application, improves the user experience, and reduces the processing load of the RACF.

Times of Interaction are as shown in the table below:

TABLE 1

| Current Channel | New Channel | Times of Interaction | Remarks |
| --- | --- | --- | --- |
| Ordinary Program | Ordinary Program | 1 | STB→DSLAM |
| Ordinary Program | High Definition Program | 3 | STB→DSLAM→RACF→DSLAM |
| High Definition Program | Ordinary Program | 1 | STB→DSLAM; DSLAM→RACF |
| High Definition Program | High Definition Program | 1 | STB→DSLAM |

In the disclosure, the service application information of the CPE is directly received by the SACA without being sent to a service control unit at a network core domain, thus reducing the delay of the service application information of the CPE from being sent to being received.

Moreover, in the disclosure, the service access right of the user is verified first before processing the service application information. Only the service application information of the user that passes the verification is processed, and the service application information of the user that fails to pass the verification is rejected. Therefore, the service manageability is improved.

Furthermore, in the disclosure, user services that have the same forward path, may use the same type of bearer resources and will not be accessed at the same time can be associated, so as to facilitate the user to switch among the associated services.

What's more, in the disclosure, when the user switches among the associated services, if the resources are surplus, excess bandwidth resources will be released. If the resources are insufficient, only the insufficient resources are applied. Therefore, the utilization of the network resources is improved.

Detailed description has been given hereinabove with respect to a service application method, a service application system, and an SACA provided in the disclosure. Herein, the principles and implementations of the disclosure are set forth through specific embodiments, which are merely intended to demonstrate the method of the disclosure and the core ideas thereof. It will be apparent to those skilled in the art that various modifications and variations can be made to the structure of the disclosure without departing from the scope or spirit of the invention. In view of the foregoing, it is intended that the disclosure cover modifications and variations of this invention provided they fall within the scope of the following claims and their equivalents.

What is claimed is:

1. A method for switching to a new channel, comprising:
   pre-configuring, by a business and operation support system (BSS/OSS), a corresponding relationship between channels and IP multicast addresses, bandwidth required by each of the channels, and rights of a user to watch the channels, to a service application control agent (SACA), wherein the SACA is located on a digital subscriber line access multiplexer (DSLAM);
   associating, by the SACA, channels having the same forward path, capable of using the same type of bearer resources, and unable to be accessed at the same time;
   wherein when the user switches to the new channel, a set top box (STB) sends an Internet group management protocol (IGMP) packet, and the SACA detects the IGMP packet and determines whether the user can watch the new channel according to an IP multicast address in the IGMP packet, the corresponding relationship between channels and IP multicast addresses, and the rights of the user to watch the channels;
   wherein when the user has rights to watch the new channel, a bandwidth required by the new channel is extracted and compared with a bandwidth of a current channel;
   if the bandwidth of the new channel is equal to the bandwidth of the current channel, the SACA controls the DSLAM to complete user-oriented broadcast television (BTV) channel replication, so as to allow the user to watch the new channel;
   if the bandwidth of the new channel is narrower than the bandwidth of the current channel, the SACA controls the DSLAM to complete user-oriented BTV channel replication, so as to allow the user to watch the new channel, and the SACA sends a bearer resource release indication to the RACF to release idle bearer resources;
   if the bandwidth of the new channel is wider than the bandwidth of the current channel, the SACA sends a bearer resource reservation request to a resource and admission control function (RACF) to apply for additional bearer resource; the RACF performs resource admission control processing according to use conditions of bearer resources and notifies a processing result of resource admission control to the SACA; if the RACF admits the bearer resource reservation request, the SACA controls the DSLAM to complete user-oriented BTV channel replication, so as to allow the user to watch the new channel; if the RACF does not admit the bearer resource reservation request, the user is not allowed to watch the new channel.

* * * * *